Patented Feb. 9, 1954

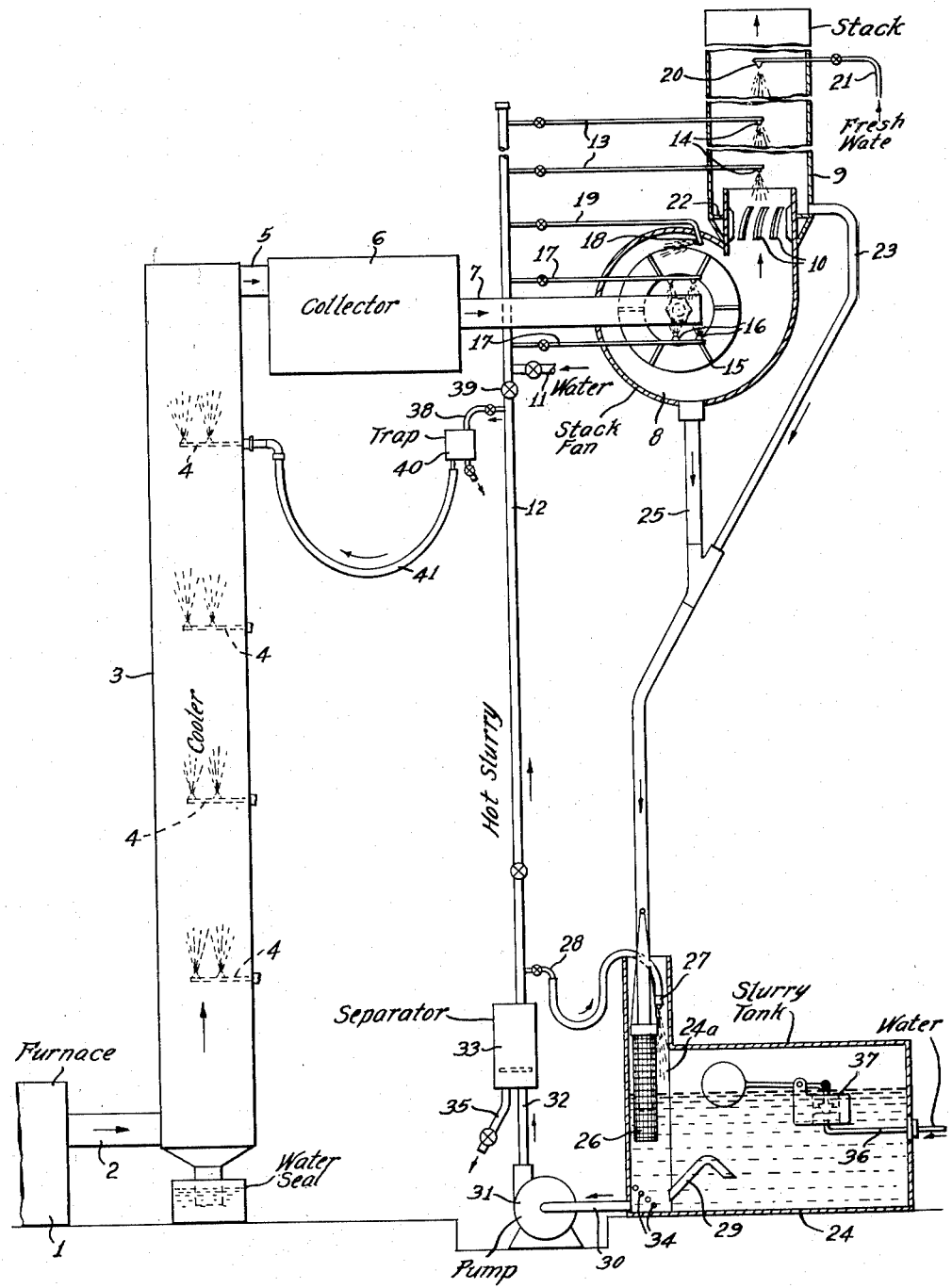

2,668,754

UNITED STATES PATENT OFFICE 2,668,754

PROCESS FOR RECOVERING CARBON BLACK FROM A GASEOUS SUSPENSION

Merle F. Lichtenfels, Monroe, La., assignor to Columbian Carbon Company, New York, N. Y., a corporation of Delaware Application February 23, 1950, Serial No. 145,701

3 Claims. (Cl. 23—209.9)

The present invention relates to the problem of recovering carbon particles from gaseous suspensions and, more particularly, relates to the recovery of residual carbon particles from the effluent gases from plants for producing furnace carbon black.

In accordance with conventional practice in the production of furnace carbons, the furnace black is carried from the furnace, in which it is formed, in suspension in hot furnace gases, the suspension is cooled and the major portion of the carbon is separated from the gases by means of the combined action of electrical precipitators and centrifugal separators. From the separators, the gases carrying any residual carbon in suspension are passed to the stack and, from thence, into the atmosphere, frequently as a dense black smoke.

The present invention is directed primarily to the separation and recovery of this residual carbon from the stack gases. It provides an improved method of recovering the residual carbon and also improved apparatus especially adapted to the carrying out of the recovery method. This recovery is highly desirable from the standpoint of the value of the recovered carbon black but even more important is the avoidance of contaminating the atmosphere of the surrounding countryside with carbon black.

It has heretofore been proposed to wash dust particles and the like, from effluent stack gases by spraying the gases with water, or by passing the gases in contact with surfaces wet with water. This procedure has not heretofore been found satisfactory with respect to the recovery of residual furnace carbons for a number of reasons. In the first place, furnace blacks are hydrophobic, i. e., difficultly wetted with water. Further difficulties experienced in efforts to recover residual furnace blacks by wet stack methods have been the excessive amounts of water required, the large volumes of slurry formed and the difficulty of disposing of the slurry. Also, as previously noted, the carbon black constituent of the slurry has represented a considerable economic loss.

By the present invention, the difficulties heretofore experienced are avoided to a very substantial extent, if not completely. A cleaner stack may be consistently maintained and lower plant operating costs may be established.

In operations of this sort, the gases passing from the furnace and carrying the carbon black in suspension are exceedingly hot, the temperature usually being of the order of at least 1,000° F. and it is desirable, as previously noted, to cool these gases before attempting to separate the suspended carbon therefrom. This cooling is usually accomplished by spraying the gases with water in a cooling zone positioned between the furnace outlet and the carbon black precipitator.

In accordance with an important aspect of my present invention, I dispose of and utilize the aqueous suspension of residual carbon black and, at the same time, recover the residual carbon from the suspension, by injecting the suspension, advantageously as a spray, into the hot furnace gases in the cooling zone. By reason of the high temperature of the gases, the water of the suspension is quickly flashed into steam, or water vapor, and the carbon black constituent thereof becomes resuspended in the gases passing to the precipitator and collection system.

Previous attempts to recover carbon black from aqueous slurries by evaporation of the water constituent of the slurry have resulted in a recovered carbon of undesirable characteristics. By my present process, apparently by reason of the sudden flashing of the water into steam, large aggregates of carbon black particles are exploded in such a way that the carbon is resuspended in what appears to be the original finely divided form.

In accordance with a further particularly advantageous aspect of my invention, the scrubbing of the stack gases with water is accomplished, in part at least, by vigorously agitating the gaseous suspension with water. This may, with advantage, be accomplished by spraying the water, or other aqueous scrubbing medium, into the stack gases in a zone or at a point just ahead of the zone in which the gases are subjected to vigorous mechanical agitation, for instance, just ahead of a centrifugal blower, or fan, advantageously a fan of the "paddle-wheel" type, the blades of which are kept wet with the scrubbing medium. I have found that, in this way, the proportion of carbon particles left suspended in the stack gases may be reduced to a point where the gaseous effluent from the stack is substantially colorless, or even white, by reason of the presence of water vapors. By this procedure, residual carbon in the stack effluent gases has been reduced to as low as 0.04 grain of carbon black per cubic foot of gas, measured at stack conditions.

Advantageously, the aqueous scrubbing medium may be repeatedly passed in contact with the stack gases, either in the stack or in a zone just ahead of the stack or both, so as to increase the concentration of the carbon in the slurry prior to injecting it into the cooling zone. This may be accomplished by repeatedly passing the aqueous scrubbing medium in contact with the gaseous suspension in a closed cycle, bleeding off a portion of the slurry and injecting it into the cooling zone, as previously indicated, and replenishing the amount of scrubbing liquid in the cycle, as by adding fresh water thereto. The fresh water is, with advantage, added to the cycle by spraying or otherwise bringing it into contact with the stack gases which have previously been washed with the scrubbing liquid of the cycle, as more fully appears hereinafter. The scrubbing of the gases and the bleed from and feed to the cycle are advantageously continuous and at a uniform rate.

My invention will be further described and a highly desirable embodiment thereof specifically illustrated, by reference to the accompanying drawing, which represents apparatus particularly adapted to the carrying out of the process. It is to be understood that the drawing is highly diagrammatic, is not intended to be drawn to scale, and does not indicate the relative sizes of the various elements of the apparatus.

In the drawing, the furnace in which the carbon black is produced is diagrammatically represented at 1. From the furnace 1, the furnace effluent gases carrying the carbon black in suspension pass through conduit 2 into the lower end of the vertical cooler 3. In passing up through the cooler, the hot gases come into contact with water sprays from spray nozzles 4, connected to any convenient source of cooling liquid under pressure, water, for instance, or a slurry of water and residual carbon resulting from the scrubbing of the stack gases, as herein described.

From the upper end of the cooler, the suspension, usually cooled to a temperature of 500° to 600° F., passes through conduit 5 to a collecting system, ordinarily comprising an electrical precipitator and one or more cyclone separators, and which is diagrammatically illustrated at 6. From the collector system, the effluent gases from which the major portion of the suspended carbon has been separated, but which still contain considerable residual carbon, pass through conduit 7, aided by stack fan 8, into the lower end of the stack represented at 9. From the upper end of the stack, the stack gases pass into the atmosphere.

The lower end of the stack is provided with baffles, or fins, represented at 10, designed to impart a whirling motion to the stack gases, so as to tend to throw any solid or liquid particles suspended therein against the outer walls of the stack by centrifugal force.

A liquid scrubbing medium, advantageously water, may be fed to the system through valved connection 11, conduit 12, and valved branch conduits 13 to the spray heads or nozzles 14 positioned within the stack. Also positioned in the stack fan housing just ahead of the rotor 15, I have shown spray nozzles 16, connected to the conduit 12 by the valved connections 17. A spray nozzle 18 is positioned in the fan housing in the path of the gases between the rotor and the stack so as to direct a spray onto the fan blades. This spray nozzle is connected with the conduit 12 by means of valved connection 19.

Also, positioned within the stack is the spray nozzle 20 connected with a source of scrubbing liquid, advantageously fresh water, by a valved connection 21.

It will be understood that the present invention is not restricted with respect to the number of spray nozzles used in the stack, or at the stack fan, or in the cooling zone, the invention contemplating the use of such number of sprays as may be required under the particular operating conditions encountered to effect the desired scrubbing and cooling of the gases.

The lower end of the stack is provided with a trough 22. The spray water falling downwardly through the stack, or running down the inner walls of the stack is collected in the trough, is withdrawn therefrom through conduit 23 and flows by gravity to the slurry tank 24. The lower end of the fan housing is also connected with conduit 23 by means of branch conduit 25.

The lower end of conduit 23 is surrounded by a basket strainer 26 of mesh wire, or the like, adapted to separate from the sludge passing from the stack and fan any large particles of solid matter, such as rust scale or sintered particles of carbon.

The slurry tank, as shown, is partitioned by an impervious plate 24a to provide a relatively large, quiescent reservoir chamber to the right of the partition and a relatively small chamber to the left of the partition. The conduit 23 enters the top of the smaller chamber in which, because of its relatively small transverse area, the slurry is kept in a state of turbulence whereby settling out of the carbon black is inhibited. At times a foaming may occur in the chamber and frequently a considerable portion of unwetted black will be found to float on the top of the liquid in the chamber. To correct these conditions, I provide a wetting spray 27, flexibly connected through the valved connection 28 with a conduit 12, as is more fully hereinafter described.

The reservoir chamber of the slurry tank is connected with the smaller chamber by a 2 inch crooked pipe 29, adapted to equalize the liquid level in the two chambers of the slurry tank with a minimum of mixing.

Leading from the lower end of the slurry tank, there is provided a conduit 30 leading to the low pressure side of pump 31. The high pressure side of the pump is connected with the lower end of conduit 12 through conduit 32 and separator 33. Spaced rods 34 are provided across the exit from the tank to conduit 30, to afford further protection of the pump and nozzles from such damage as might occur by reason of an intake of relatively large solid particles.

The separator 33 may be of a conventional upflow gravity type, and is designed to remove any lumps of heavy materials which might tend to plug the spray nozzles. The separator is provided with a valve outlet 35 for blowing out any separated solid, as well understood by the art.

The slurry tank is provided with a fresh water inlet 36, equipped at its inner end by a float valve 37, whereby a constant level of water, or slurry, is maintained in the slurry tank.

In operation, fresh water may be continuously supplied through the valved connection 11 and sprayed into the stack and fan zones, as previously described, the resultant slurry passing by gravity to the slurry tank 24. Slurry will be withdrawn from the slurry tank by pump 31 through conduit 30 and forced through conduit 32, separator 33, conduit 12 and the branch conduit 38, valve 39 in conduit 12 being closed. From conduit 38, the slurry is forced through trap 40 and flexible line 41 to one or more of the spray nozzles 4 in the vertical cooler. Though, in the drawing, I have shown a connection between conduit 12 and only the upper sprays of the cooler, it will be understood that provisions may be made for injecting the slurry to any zone, or zones of the cooler. In this method of operation, it will usually not be necessary to inject additional fresh water through line 21 and the introduction of fresh water through line 36 will usually not be desirable.

Though satisfactory operation may be obtained by the method just described, I usually prefer to pass the slurry repeatedly in contact with the hot gases in the stack, or stack fan, or both, as previously noted, especially where maximum economy in water is desired. By the preferred method of operation, valve 39 in conduit 12 is open and after operating conditions have been established, including the desired liquid level in the slurry tank, the valved connection 11 is usually closed. The slurry passing to the slurry tank from the stack and fan housing is withdrawn from the tank by the pump 31 and is again sprayed under the pump pressure through spray nozzles 14, 16, and 18, or any one or more of them, into the stack gases. The slurry is thus repeatedly cycled through a closed ring.

A regulated portion of the slurry is withdrawn from the cycle through valved conduit 38 and is injected into the vertical cooler in the manner previously described. There will be added to the cycle fresh water, advantageously at a rate such as to maintain the volume of slurry in the cycle substantially constant.

As previously noted, furnace carbon blacks are not readily wetted with water, due to their hydrophobic nature. Consequently, residual furnace black cannot be separated completely from the stack gases by conventional wet stack methods. I have found, however, that where, prior to passing to the stack, the stack gases, together with a water spray, are subjected to vigorous mechanical agitation, such as results from passing the mixture through the stack fan, as herein described, a remarkably complete separation of furnace carbons from the stack gases may be attained.

I have also found that, in order to obtain most efficient separation of carbon black from the stack gases by wet stack methods, it is necessary that the temperature of the stack gases be reduced by the water spray to below the dew point. The amount of cold water required to chill the gases to that temperature has been so excessive as to render the method impractical where water supply is limited.

I have found, however, that by the vigorous mechanical agitation herein described, I can greatly increase the extent of cooling of the stack gases by a given amount of water. For example, by spraying a certain fixed amount of water into the stack gases, without the vigorous mechanical agitation, the exit temperature of the stack gases was found to be in excess of 200° F., i. e., considerably above the dew point. Using the same amount of water, but injecting a portion of it into the gases entering the stack fan, as herein described, resulted in a drop in exit stack temperature to 160°–180° F.

In its broader aspect, the invention is not restricted to the effecting of the vigorous mechanical agitation of the gases with the water spray by the stack fan, but contemplates the use of other mechanical agitating devices whereby the stack gases, having residual carbon and also small droplets of water suspended therein, are caused to impinge violently and repeatedly upon solid wetted surfaces. This type of agitation is not to be confused with the much milder type whereby the gaseous suspension is subjected merely to a swirling motion past confining walls.

I have found, however, that by using the stack fan, as specifically described herein, the required vigorous mechanical agitation is effected without necessitating the use of additional agitating apparatus and, in accordance with my preferred modification of the invention, the vigorous mechanical agitation of the stack gases with water is effected by spraying water, into the fan housing in such a manner as to assure a film of water on the rotating paddles at all times, so that the carbon particles are given a violent spanking with the wet paddles.

Reference in the preceding paragraphs to violent agitation of the stack gases with water will, of course, be understood to apply equally to the use of an aqueous slurry, in place of fresh water.

In order that the slurry may satisfactorily be sprayed into the cooler, it is desirable that a uniform slurry of the water and residual carbon be obtained. To accomplish this, the black must be well wetted by the water. Any black carried to the slurry tank, but not thoroughly wetted, will be found to float on the surface of the slurry and this may be wetted so that it will become uniformly mixed with the slurry by spraying the floating carbon with fresh water or slurry through spray nozzle 27 and valved connections 28, connected with the high pressure side of the pump 31.

It will be understood that uniform mixing of the black with the slurry is necessary in order that the slurry may be satisfactorily sprayed without plugging the spray nozzles. It will be apparent that as great a proportion as possible of the residual carbon passed to the slurry tank, should be injected into the cooler so that the residual carbon thus recovered may be collected and separated by the collector unit 6.

Thus, the residual carbon may, by my present invention, be continuously recovered from the stack gases and from the resultant slurry in a substantially dry, finely divided form, unimpaired as to its physical and chemical characteristics.

The invention and the effectiveness of its operation are illustrated by the following specific examples of its use as applied to a commercial sized furnace black installation in which the volume of gases passed to the stack was about 33,000 cubic feet per minute, measured at their normal temperature of 420° F. at the exit from the collector system.

In normal operation, the gas is passed from the stack at a temperature of about 410° F., containing 1.13 grains of carbon black per cubic foot of gas. By spraying cold water into the stack at the rate of nine gallons per minute, the carbon black content of the effluent stack gases was reduced to 1.09 grains per cubic foot, the temperature of the effluent gases still being considerably above the dew point.

By using a total of 33 gallons per minute of scrubbing and cooling medium as follows:

16.5 G. P. M. of slurry to fan at 16
7 G. P. M. of water to fan at 18
9 G. P. M. of water to stack at 20 the carbon content of the effluent gases from the stack was reduced to 0.37 grain per cubic foot and its temperature to about the dew point, 170° F.

By using a total of 72 gallons per minute of scrubbing and cooling medium as follows:

31 G. P. M. of slurry to fan at 16
5 G. P. M. of slurry and
7 G. P. M. of water to fan at 18
11 G. P. M. of slurry to stack at 14
18 G. P. M. of water to stack at 20 the carbon content of the effluent gases was reduced to 0.22 grain per cubic foot (measured as dry gas at 32° F.) and its temperature was reduced to about 160° F., i. e., below its dew point.

The slurry passed to the fan in the last two operations was obtained by recycling the slurry from the stack and fan housing substantially as herein described. From this cycle, slurry was withdrawn and injected into the cooling zone, as herein described, at a rate of about 10 gallons per minute.

I claim:

1. The process of recovering carbon black from a hot gaseous suspension thereof produced by a carbon black furnace which comprises passing the gaseous suspension through a cooling zone, spraying it in said cooling zone with a fluid aqueous slurry of carbon black thereby vaporizing the water constituent of the slurry and reducing the temperature of the hot gases, passing the cooled gaseous suspension through a dry precipitating zone and there separating a major portion of the suspended carbon from the cooled gases in a dry state, passing the gases with residual carbon suspended therein through a washing zone and there contacting the gases with a continuously recycled fluid aqueous slurry of carbon black thereby removing residual carbon from said gases, withdrawing a portion of said carbon black slurry from the washing cycle and spraying this slurry into the hot gaseous suspension in the cooling zone, and adding make-up water to the recycled slurry to maintain substantially constant the volume of slurry in the cycle.

2. The process of claim 1 further characterized in that the suspension is subjected to violent mechanical agitation with water while passing through the washing zone.

3. The process of recovering carbon black from a hot gaseous suspension thereof produced by a carbon black furnace which comprises passing the gaseous suspension through a cooling zone, spraying it in said cooling zone with a fluid aqueous slurry of carbon black, thereby vaporizing the water constituent of the slurry and reducing the temperature of the hot gases, passing the cooled gaseous suspension through a dry precipitating zone and there separating a major portion of the suspended carbon from the cooled gases in a dried state, passing the gases with residual carbon suspended therein through an agitating zone and therein subjecting the suspension to violent mechanical agitation with water, thereby removing residual carbon from the said gases as a fluid aqueous slurry, passing the gases from the agitating zone to a stack and there contacting the gases with water, thereby removing further residual carbon from said gases as a fluid aqueous slurry, combining the slurry from the stack with the slurry from the agitating zone and spraying the resultant slurry into the hot gaseous suspension in the cooling zone.

MERLE F. LICHTENFELS.

References Cited in the file of this patent

UNITED STATES PATENTS

| Number | Name | Date |
|---|---|---|
| 866,706 | Zellweger | Sept. 24, 1907 |
| 1,438,032 | Frost | Dec. 5, 1922 |
| 1,799,084 | Brdar | Mar. 31, 1931 |
| 1,801,436 | Lewis | Apr. 21, 1931 |
| 2,368,828 | Hanson et al. | Feb. 6, 1945 |